UNITED STATES PATENT OFFICE.

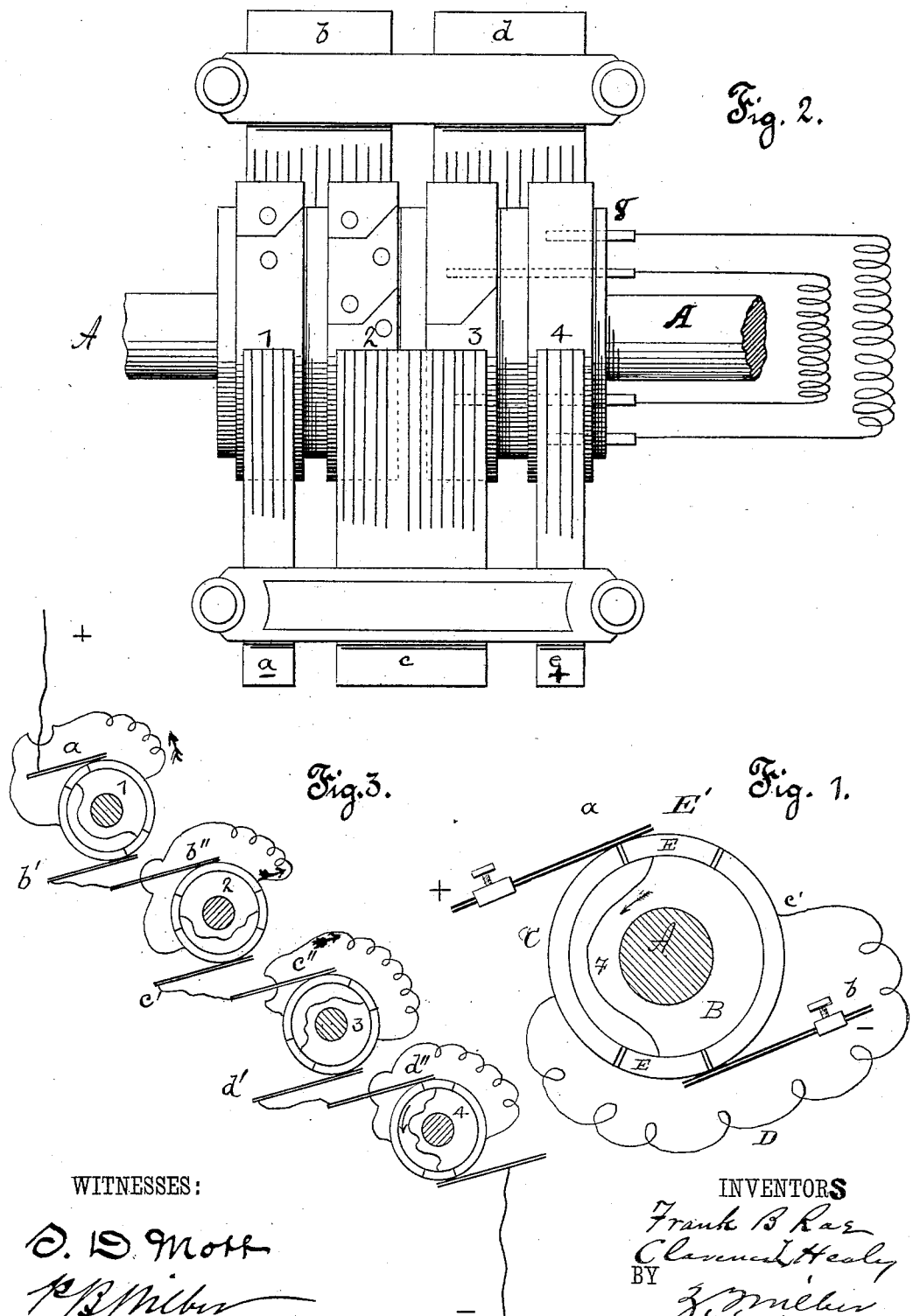

FRANK B. RAE AND CLARENCE L. HEALY, OF SAN FRANCISCO, CALIFORNIA.

COMMUTATOR FOR DYNAMO OR MAGNETO ELECTRIC MACHINES.

SPECIFICATION forming part of Letters Patent No. 294,270, dated February 26, 1884.

Application filed March 12, 1883. (No model.)

*To all whom it may concern:*

Be it known that we, FRANK B. RAE and CLARENCE L. HEALY, citizens of the United States, residing at San Francisco, in the county of San Francisco and State of California, have invented a new and useful Improvement in Commutators for Dynamo or Magneto Electric Machines, of which the following is a specification.

Our invention relates to improvements in commutators for dynamo or magneto electric machines producing a current of constant direction; and the objects thereof are, first, to connect the active coils of the armature with the external circuit in series; second, to shunt the external circuit and active coils of the armature past the inactive coils without short-circuiting such inactive coils; third, to obtain a greater electro-motive force at a less speed and expenditure of power without decreasing the ampere current in the external circuit; and, fourth, to decrease the heating effect in the armature. To attain these ends we make the commutator of a number of sections or rings—one section or ring for each coil of the armature—when the armature is of the Siemens type, or one section or ring for what may be termed "two coils" when the armature is of the Pacinotti or Gramme type. Each of these sections or rings is composed of four sections or plates, two of which, diametrically opposite, may be termed the "active sections," to which the free ends of the coil in one case or of the coils in the other case are connected alternating with two smaller and diametrically-opposite sections, which may be termed the "neutral sections," and which are electrically connected together. These latter sections are of a size proportionate to the neutral section of the machine. Upon each section or ring these neutral sections are so adjusted or positioned relatively to the coil or coils to which the ring pertains that they are in contact with proper commutator-brushes when such coil or coils are in the neutral space of the machine, so that these neutral portions, being electrically connected, shunt the current of the active coils around their own inactive coils and break or shunt its circuit. With such a commutator provision must be made for connections from section to section of the commutator. This is effected by the use of a number of brushes. Of these single brushes bear upon the end sections or rings, forming the terminals of the exterior circuit, while double brushes—that is, brushes adapted to bear on two rings or sections at once—connect alternately the remaining sections or rings of the series—that is, suppose four coils are used, a single brush bears upon one and a single brush on four, while double brushes bear upon one and two, two and three, three and four, respectively, the neutral portions of the ring being echelon, so to speak, or so that they form a spiral around the whole commutator. With such an arrangement all the active coils of the armature are connected in one series, while the inactive coil or coils are cut out, accomplishing the object hereinbefore set forth.

Suitable arrangements for carrying the invention into effect are illustrated in the drawings, in which—.

Figure 1 is a transverse section of commutator divided through one of the rings. Fig. 2 is a top view or plan of a complete commutator with brushes in position; and Fig. 3 is a diagram of a commutator, showing the electrical connections of the sections or rings with the armature-coils and external circuit.

A is the shaft of an armature, to which is attached a cylinder of insulating material, B, supporting the segments forming the sections or rings 1 2 3 4.

C C' are the segments to which are attached the ends of a single coil, D, in a machine of the Siemens type, or of the two coils in a machine of the Gramme type.

E' E are the neutral sections or segments, of a length proportionate to the neutral space of the machine, and electrically connected together by the conductor F, arranged in any suitable manner therefor. This construction of a single section or ring is clearly shown in Fig. 1. A series of such sections or rings, as before stated, is mounted upon the insulated material on shaft A, as shown in Fig. 2, where four, 1 2 3 4, are shown. Upon these sections bear the brushes *a b c d e*, of which *a* and *e* are single brushes bearing on 1 and 4, and forming the terminals of the circuit, while *b*, *c*, and $d$ are double brushes connecting 1 and 2, 2 and 3, 3 and 4, respectively.

In Fig. 3 $b'\ b''$ represent $b$, $c'\ c''$ represent $c$, and $d'\ d''$ represent $d$ of Fig. 2.

While double brushes are shown in Fig. 2, it is evident that any other form of contact between the sections or rings which will connect in the same general manner may be used. The feature of double brushes shown is advantageous, in that it lessens the space upon the armature-shaft required for the commutator, permitting, in the example given, the use of a single brush-carrier adapted to clamp two brushes on one side and three on the other side of the commutator.

Fig. 3 is a diagram showing the sections or rings forming the commutator in Fig. 2 in such relation as to show clearly the direction of the current. In this figure the coil connected with 4 is supposed to be in the neutral point, while coils 1, 2, and 3 are active, and they are connected in series, their current being shunted around the coil attached to 4 by means of the connection F in section or ring 4. As each coil comes into the neutral space, its relation to the remaining coils is the same as that of 4, as shown in this figure. While a commutator for four coils only is shown, the principle is applicable to an armature having any number of coils, it simply being requisite that there be a section or ring for each coil when the Siemens type is used, or for each two coils when they are diametrically connected, as in the Gramme type.

Having thus described our invention, what we claim, and desire to secure by Letters Patent, is—

1. In a commutator for dynamo or magneto electric machines, a series of rings or sections composed of four segments each, two of which, diametrically opposite, are of a length proportionate to the neutral space of the machine and electrically connected together, substantially as set forth.

2. In a commutator for dynamo or magneto electric machines, a series of rings or sections composed of four segments each, two of which, diametrically opposite, are connected with the free ends of a coil or coils, substantially as set forth.

3. A commutator for dynamo or magneto electric machines, consisting of a series of metal rings or sections, each made in four parts and connected in pairs, as described, in combination with a series of brushes, so that a current of constant direction passes from one coil to the next through a brush adapted to bear upon the commutator-sections of both such coils, substantially as set forth.

4. A commutator for dynamo or magneto electric machines, consisting of a series of rings composed of four sections or parts connected as described, and brushes arranged substantially as described, so that all the active coils are connected in series, and their current is shunted around the inactive coil or coils, substantially as set forth.

FRANK B. RAE.
CLARENCE L. HEALY.

Witnesses:
S. B. RANKIN,
L. W. STORROR.